United States Patent [19]
Ohta

[11] 4,299,449
[45] Nov. 10, 1981

[54] ACOUSTOOPTIC MODULATOR

[75] Inventor: Yoshinori Ohta, Tokyo, Japan

[73] Assignee: Nippon Electric Co., Ltd., Tokyo, Japan

[21] Appl. No.: 57,150

[22] Filed: Jul. 12, 1979

[30] Foreign Application Priority Data

Jul. 12, 1978 [JP] Japan .................................. 53-85500
Jul. 12, 1978 [JP] Japan .................................. 53-85509

[51] Int. Cl.³ ................................................ G02F 1/11
[52] U.S. Cl. .................................................... 350/358
[58] Field of Search ....................... 350/354, 356, 358

[56] References Cited

U.S. PATENT DOCUMENTS

| | | | |
|---|---|---|---|
| 3,424,906 | 1/1969 | Korpel | 350/358 |
| 3,447,855 | 6/1969 | Skinner | 350/356 |
| 3,752,563 | 8/1973 | Torok et al. | 350/162 R |
| 4,040,722 | 8/1977 | Nielsen | 350/358 |
| 4,082,424 | 4/1978 | Sauter et al. | 350/96.11 |
| 4,148,556 | 4/1979 | Sauter et al. | 350/162 R |

Primary Examiner—William L. Sikes
Assistant Examiner—Léon Scott, Jr.
Attorney, Agent, or Firm—Sughrue, Mion, Zinn, Macpeak & Seas

[57] ABSTRACT

An acoustooptic modulator is provided with an electroacoustic transducer which generates a non-uniform acoustic wave distribution. The distribution of the acoustic wave excitation varies along the direction of light passage through the acoustooptic medium.

9 Claims, 6 Drawing Figures

ACOUSTOOPTIC MODULATOR

BACKGROUND OF THE INVENTION

The present invention relates to an optical modulator and more particularly to an acoustooptic modulator for changing the intensity of light beams by an optical diffraction effect of acoustic waves in an acoustooptic medium in response to electrical modulation signals.

The acoustooptic modulator has a number of advantages such as a low operating voltage, stability of operating characteristics against variation in ambient temperature, and high quenching ratio, compared with other high-speed optical modulators. The acoustooptic modulator is, therefore, used extensively in various recorders and display equipment which use laser beams.

The bandwidth of the modulation signals in which the acoustooptic modulator can be used efficiently is not very wide, about 20 to 30 ns minimum in rise time and fall time of diffracted light. The following are understood to be the reasons for restriction of the modulation speed. When the incident light is a Gaussian beam of diameter $2W_o$ ($W_o$ is a radius at which the optical power density is $1/e^2$ of that at the center), the rise time t of the modulated light can be given by minimum $t \approx 1.3 W_o/V$, where V is the velocity of the acoustic wave in the accoustooptic medium. The modulation speed can be increased by making the beam radius $W_o$ smaller. When the beam $W_o$ is made smaller, the spreading angle of the Gaussian beam increases. The spreading angle can be expressed by $\lambda/(n. \pi. W_o)$, where $\lambda$ is the wavelength of light in a vacuum, and n the refractive index of the medium. Unless Bragg conditions are met along the entire region of angle components of the incident light in the acoustoopic medium, only optical wave components of the angle matching these conditions will be diffracted. Thus, the diffraction efficiency decreases when the incident light beams are narrowed in order to increase the modulation speed. Further, the diffracted light deviates from the Gaussian shape.

To prevent this, the spreading angle of the acoustic wave should be increased to at least the same level as that of the spreading angle of light. To accomplish this, the transducer for exciting acoustic waves in the medium has to be shortened in the light passing direction. Suppose, for example, a lead molybdate ($PbMoO_4$) crystal, which is a well known acoustooptic crystal, is employed as the acoustooptic medium and the frequency of the acoustic wave is set at 200 MHz. To secure a modulation speed of below 10 ns rise time for the diffracted light in this case, the length of the transducer has to be shortened to below 2—3 mm. However, the diffraction efficiency is in proportion to the length of the transducer (i.e., working length), as is well known. For this reason, greater acoustic-wave drive power will be required to increase the intensity of the diffracted light. Reducing this working length of acoustic waves against the light is equivalent to reducing the thickness of the diffraction grid. For this reason, the diffraction phenomenon progresses from the Bragg reflection to the Raman-Nath diffraction. Therefore, the maximum diffraction efficiency that can be theoretically attained is decreased compared with a greater working length, even if the acoustic wave power is increased.

As one method of giving wide-angle components to the surfaces of acoustic waves without reducing the working length, a cylindrical acoustic wave is excited in the medium. An acoustooptic modulator with a relatively high speed can be realized by this method (c.f., "IEEE JOURNAL OF QUANTUM ELECTRONICS," Vol. QE-6, No. 1, January 1970, p.p. 15-24).

However, the surface of the acoustooptic medium must be cylindrically finished in order to install such a transducer. High-frequency transducers that can be installed on such a surface are limited to a piezoelectric thin-film transducer formed by an evaporation or sputtering method. It is very difficult to bond a regular piezoelectric crystal plate on a curved surface. For this reason, a piezoelectric high-coupling material such as a lithium niobate ($LiNbO_3$) crystal cannot be used, and therefore an increase in drive power is inevitable. In conclusion, it is difficult to simultaneously attain a high speed and high efficiency modulation with conventional acoustooptic modulators.

SUMMARY OF THE INVENTION

Accordingly, an object of the present invention is to provide a high-speed and highly efficient acoustooptic modulator.

The present invention is featured by an electrode configuration which is attached to an electro-acoustic transducer, which in turn is attached to an acoustooptic medium and is split and so shaped that an intensity distribution of the electric field applied to the electro-acoustic transducer be varied in the light passing direction. In particular, by making the distribution of acoustic-wave excitation by the electro-acoustic transducer a functional form of $(\sin x)/x$, where x is a length in the light passing direction, the distribution of diffracted light becomes rectangular. As a result, the intensity of diffracted light does not decrease even if it deviates from the Bragg angle, so that the incident light can be narrowed and the modulation speed increased. Further, since the diffraction efficiency is uniform over the entire angle of the diffracted light beam, deformation of the beam can be prevented.

The fundamental principle of this invention is based on the following two findings. The first is a theoretical and experimental finding that the incident angle characteristics of the intensity of light diffracted by acoustic waves, relative to the surface of those waves, shows a Fraunhofer diffraction pattern of acoustic wave power emitted by the electro-acoustic transducer. The second is an optical finding that, where the shape of an aperture is line symmetry, the amplitude of the wave of the diffracted image on the symmetric axis is a Fourier conversion of a function defining the shape of the aperture.

DETAILED DESCRIPTION OF THE PREFERRED EMBODIMENT

Figure 1:
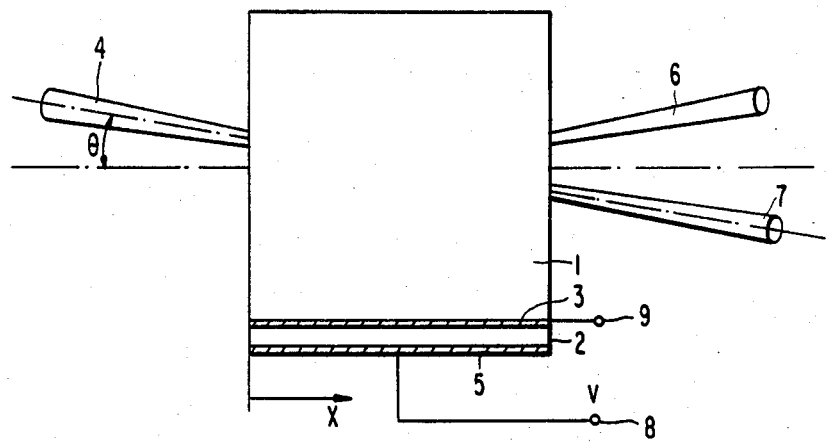
FIG. 1 is a general schematic diagram of an acoustooptic modulator.

Referring to FIG. 1, the acoustooptic medium 1 is a rectangular parallelepiped of a material which can diffract light in response to acoustic wave excited therein such as optical glass or dielectric crystal. An electro-acoustic transducer 2, such as a piezoelectric plate, is bonded to the bottom surface of the acoustooptic medium 1 by an organic bonding agent or a low-melting-point metal.

The transducer 2 has electrodes 3 and 5 on both faces, to which external terminals 9 and 8 are electrically connected. When a high-frequency voltage $V_o$ is supplied to the terminals 9 and 8, a high-frequency electric field applied between two electrodes 3 and 5 generates so-called thickness vibration which has different displacement directions between the upper and lower faces of the transducer plate and excites a high-frequency acoustic wave into the acoustooptic medium 1. An incident light beam 4 is applied to one side face of the acoustooptic medium 1, transmitted therethrough and emitted as a non-diffracted light beam 7 when the acoustic wave is not excited in the medium 1. Part of the incident light beam 4 is diffracted and is emitted as a diffracted light 6 when the acoustic wave is excited in the medium 1. The intensity I of the diffracted light 6 varies depending on the intensity of the acoustic wave excited in the medium 1. The general principle of the acoustooptic modulator lies in that the intensity of the diffracted light 6, or of the non-diffracted light 7, is varied in response to the electric field applied to the electro-acoustic transducer.

To increase the modulation speed, the diameter of the incident light beam should be narrowed, as explained hereinabove. The spreading angle of the light beam increases when the beam diameter is made smaller. In this instance, the optical receiving angle of the modulator should be large, so as not to decrease diffraction efficiency. This means that the distribution of the diffracted light intensity relative to the incident angle of the light beam to the modulator must be wide.

Figure 2A:
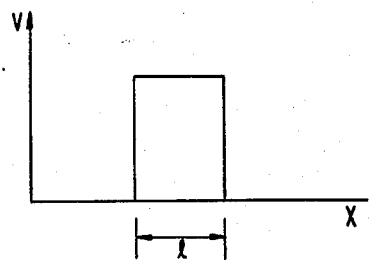
FIG. 2A is a graph showing a theoretical distribution of the electric field amplitude and phase applied to a conventional transducer.

In the past, an almost uniform electric field distribution was applied over the entire length l of the electrodes of the transducer (FIG. 2A). The electrodes are uniformly positioned over the length l in the light passing direction X. The strain distribution excited in the medium 1 is substantially the same as that of the electrid field distribution of FIG. 2A.

Figure 2B:
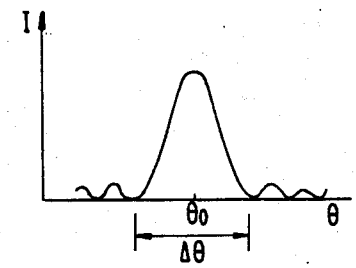
FIG. 2B is a graph showing the incident angle characteristics of the diffracted light intensity based on the electric field distribution shown in FIG. 2A.

The characteristics of the intensity I of the diffracted light 6 in FIG. 1, relative to the incident angle $\theta$ of the incident light 4, will become as shown in FIG. 2B and can be represented by $[\sin(ml\theta'/\Lambda)/(\pi l\theta'/\Lambda)]^2$, where $\Lambda$ is the wavelength of the acoustic wave and $\theta' = \theta - \theta_0$, with the Bragg angle $\theta_0$.

As stated, the intensity I of the diffracted light 6 depends predominantly on the incident angle $\theta$. Further, some consideration has to be given to permit modulating an optical wave with a thin beam diameter—that is, an optical wave with a large incidence spreading angle—efficiently and without deforming the beam profile of the diffracted light for the purpose of increasing the modulation speed. For this purpose, the incident angle width $\Delta\theta = 2\Lambda/l$ shown in FIG. 2B must be more than twice the spreading angle of the incident light ($2\lambda/n\pi W_0$), where n is the refractive index of the medium, $\lambda$ the optical wavelength, and $2W_0$ the spot diameter of the Gaussian beam. For this reason, the acoustic flux width—that is, the electrode length l of the transducer 2—has to be reduced to attain a high speed, and the diffraction efficiency that can be derived decreases compared with sufficiently long electrode length.

Figure 3A:
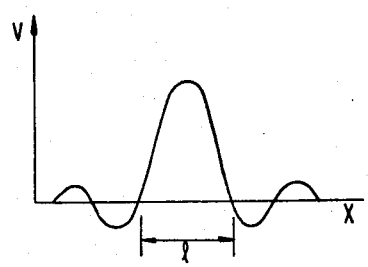
FIG. 3A shows a theoretical distribution of the electric field amplitude and phase applied to the transducer based on one embodiment of the present invention.
Figure 3B:
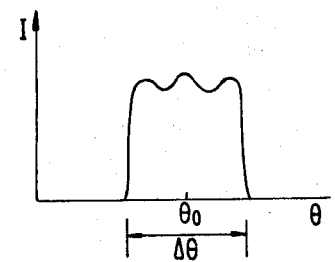
FIG. 3B presents the incident angle characteristics of the diffracted light intensity based on the electric field distribution shown in FIG. 3A.

The incident angle characteristic of the diffracted light intensity shown in FIG. 2B must be trapezoidal, in order to diffract the incident light beam 4 having large spreading angles efficiently and without deforming the beam profile of the diffracted light 6. The incident angle characteristic (FIG. 2B) of the diffracted light intensity shows a farfield pattern of acoustic wave power emitted from a rectangular aperture. To make the incident angle characteristic rectangular, as shown in FIG. 3B, the electric field distribution of the transducer in the direction X can be made, for example, (sin x)/x—that is, sin functional form as shown in FIG. 3A. This is because the incident angle characteristic is a distribution of a square of the Fourier conversion of the strain distribution generated by the electro-acoustic transducer. In the present example, it is truncated at the second auxiliary maxima of the sin function as shown in FIG. 3B, and a ripple generates on the trapezoid in the incident angle characteristic (FIG. 3B). However, the amplitude of the ripple is small, that is about ±10%.

As stated, the range of incident angle over which acceptable diffracted light intensity is obtained does not narrow, and thereby incident light with a larger spreading angle can be injected even if the electrode length l is increased, and the modulation speed increases. At the same time, the longer electrode length l increases the diffraction efficiency.

Figure 4:
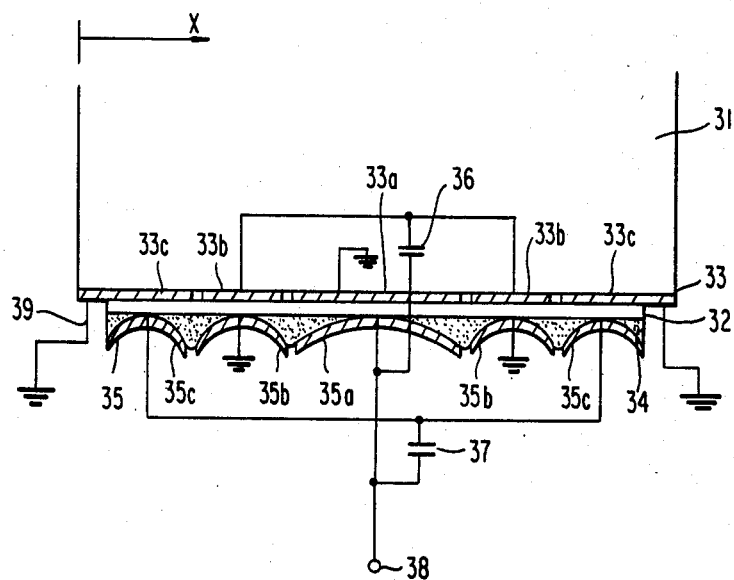
FIG. 4 is an enlarged sectional partial view of one embodiment of the invention with an electrode configuration of the transducer for obtaining the electric field distribution shown in FIG. 3A.

FIG. 4 shows the first embodiment for realizing the electric field distribution as shown in FIG. 3A. The electro-acoustic transducer 32 is made of a piezoelectric (such as lithium niobate) crystal plate. This piezoelectric crystal plate 32, and the acoustooptic medium 31, are bonded by a metal film 33 with a low melting point, such as indium, which acts as a bonding agent and lower electrode. The lower electrode 33 is divided into electrode pieces 33a, 33b and 33c, which are electrically isolated. The length of each electrode piece in the light passing direction X is l with the center electrode 33a, while those of the other electrodes 33b and 33c are l/2, respectively. The thickness of the piezoelectric crystal plate 32 is determined so that it will be efficient relative to the acoustic wave of the center frequency to be excited. A dielectric film 34 is deposited on the piezoelectric crystal plate 32 by vapor-deposition or sputtering. The thickness of the dielectric film 34 is not uniform along the light passing direction X. The thickness is largest at each boundary among the lower electrode pieces 32a, 33b and 33c, and is minimum, or zero, at the centers of the lower electrode pieces 33a, and 33b and 33c. The dielectric film 34 can be an organic dielectric material such as a photoresist, or another dielectric material such as silicon oxide. The thickness of the dielectric film 34 can be varied by, for example, vapor-deposition with a mask with apertures inserted between the source and the object to be deposited. Such a film can also be obtained by illuminating, and developing a coated photoresist.

A metal (e.g., aluminum or gold) film is provided as upper electrodes 35 on the dielectric film 34. These upper electrodes are also divided into pieces 35a, 35b and 35c, as was the case with the lower electrodes. The two layers of electrodes thus provided form a composite capacitance with the piezoelectric crystal 32 which varies according to the thickness of the dielectric film 34, the strain caused by a piezoelectric effect varies in proportion to the electric field intensity. For this reason, the amplitude distribution of the strain excited by the piezoelectric crystal plate 32 follows the distribution of the electric field applied to the crystal plate 32.

To make the strain distribution closer to the sin functional form, the maximum values of the first and second auxiliary maxima are to be lowered, and the phase of the strain of the first auxiliary maximum is to be positioned inverse to that of the second auxiliary maximum. In FIG. 4, therefore, the center upper electrode 35a is directly connected to the terminal 38 of the driving voltage Vo while the adjacent electrodes 33b and 35c are connected to the terminal 38 via external capacitances 36 and 37, respectively, and other electrodes 35b, 33a and 33c are grounded. The external capacitances 36 and 37 are finely adjusted so that the electric field distribution maintains the same proportions as the maximum values in FIG. 3A (this is done by watching the voltages applied through an oscilloscope, or other means). Thus, a strain distribution of the sin functional type that covers up to a second auxiliary maximum, and the acoustooptic modulator with a wide optical receiving aperture angle, can be achieved.

Figure 5:
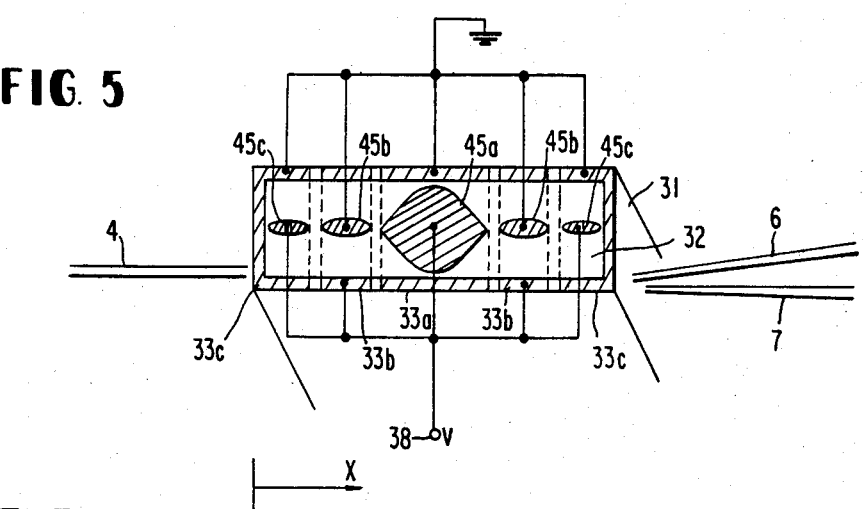
FIG. 5 and FIG. 6 are perspective, partial views of other embodiments of the invention with electrode configurations of the transducer for obtaining the electric field distribution shown in FIG. 3A.

In the above embodiment, although the dielectric film and two external capacitances are used to produce a desired strain distribution, other techniques are also possible. First, referring to FIG. 5, the second embodiment which uses weighting by neither a dielectric film nor an external capacitance will be explained. In the second embodiment, the overall weighting is derived by serially connecting a transducer sandwiched between the upper and lower electrodes, determining the appropriate width of each electrode in a direction orthogonal to the optical transmission direction, and then weighting each capacitance. In FIG. 5, the contour of the upper electrodes, 45a, 45b and 45c is in the sin functional form. The phase of the voltage applied to the adjacent upper electrode 45b corresponding to the second auxiliary maximum of the sin function is opposite to that of the voltage applied to adjacent electrodes 45a and 45c. The lower electrode is split into portion 33a, 33b and 33c. The electrodes 45a, 45c and 33b are connected to the terminal 38 of the driving voltage Vo, and the electrodes 45b, 33a and 33c are grounded. By arranging the transducer in this way, a rectangular form is given to an angular characteristic of the diffracted light 6 which is transmitted underneath the center axis of the electrode pattern and is diffracted by an acoustic wave, as shown in FIG. 3B. As stated, a high modulation speed can thus be realized.

Figure 6:
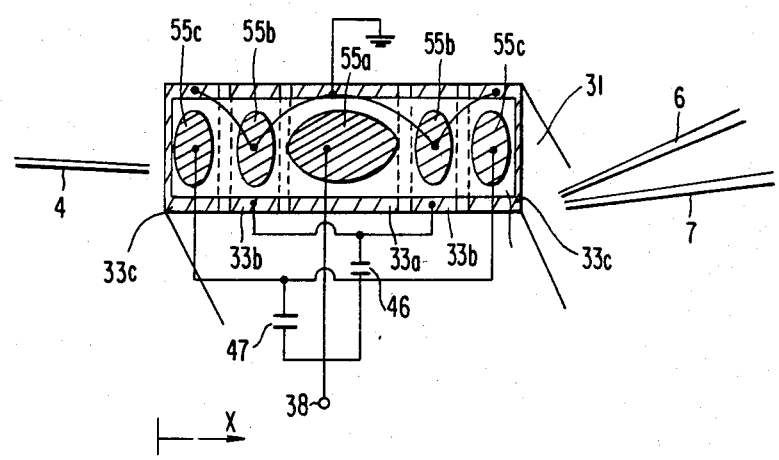

The transducer can also be configured as shown in FIG. 6. Only the electrode pattern is given a contrivance in FIG. 5, but weighting of an applied voltage is added in FIG. 6. External capacitances 46 and 47 are connected as in FIG. 4 so that the applied voltage will differ according to the peak value of the auxiliary maximum of the sin function. The transducer has electrode pieces 55b and 55c arranged in such a way that their widths in the light passing direction and the orthogonal direction are almost identical and the width of electrode 55a in the orthogonal direction is substantially the same as that of electrodes 55b and 55c. The same effect as noted above can be obtained by this third embodiment as well.

The foregoing explanation is for designing a rectangular characteristic, relative to the incident angle, of diffracted light intensity. There are instances wherein other functional forms, such as a triangle and the Gaussian function type, are desired. In these instances, $\{(\sin x)/x\}^2$ or the Gaussian distribution can be selected as the electric field distribution.

As stated, with this invention, there will be no need to attain a formation of a transducer on a cylindrical surface of the acoustooptic medium. Furthermore, since a piezoelectric crystal plate of high coupling level can be used in an electro-acoustic transducer, a low-cost and high-performance acoustooptic modulator can be attained.

Although the above enbodiments show the cases of five divided electrodes, it is easily understood that when more than five electrodes are provided by truncating at the higher auxiliary maxima of the Sinc function, more favorable results can be obtained. Needless to say, the configuration of the electrodes is not limited to the above embodiment. Nearly, flat and square electrodes divided according to the principle of the present invention may be possible.

The following data is based on experiments with a single configuration of an acoustooptic modulator according to the present invention.

The modulator is fabricated from $PbM_oO_4$ crystal, with a 136° rotated Y-cut $LiNbO_3$ transducer bonded to the crystal with indium metal. Five electrodes on the transducer upper face include 2.5 mm length for the center electrode and 1.1 mm length for other electrodes, with inter-electrode spacing of 0.3 mm. The acoustic center frequency is chosen at 150 MHz so that the rise time in the pulse mode operation can be 15 ns, while holding the divergence ratio of the optical and acoustic beams nearly equal to 1.

In the above case, an 84% diffraction efficiency was obtained for 15 ns rise time operation with 632.8 nm light, and the diffracted light intensity frequency bandwidth (−3 dB) was 75 MHz.

What is claimed is:
1. An acoustooptic modulator comprising:
an acoustooptic medium having a first face, a second face, and a third face intersecting said first and second faces, said acoustooptic medium receiving incident light at said first face, diffracting said incident light in accordance with strains generated in said medium by acoustic waves as said incident light passes through said medium in a light passing direction from said first face to said second face, and providing a diffracted light output from said second face, said medium having a central portion;
a transducer, including a plurality of transducer portions, coupled to said third face for generating said acoustic waves in respective portions of said medium in accordance with excitation signals to thereby generate said strains in said medium; and
excitation means for exciting adjacent transducer portions with opposite phases and differing amplitudes to thereby generate strains of opposite phases and differing amplitudes in said medium, the amplitude of the strain generated in the central portion of said medium being larger than in the remaining portion of said medium.

2. An acoustooptic modulator as defined in claim 1, wherein said transducer comprises a piezoelectric crystal plate and said energizing means comprises a plurality of electrode pairs sandwiching respective portions of said plate, the opposed areas of the electrodes in one of said electrode pairs near the central portion of said medium being larger than the opposed areas of any other of said electrode pairs.

3. An acoustooptic modulator as defined in claim 2, wherein the contour of at least one electrode in each electrode pair is similar to the shape of a sin function.

4. An acoustooptic modulator as defined in claims 1 or 2, further comprising means for narrowing said incident light beam.

5. An acoustooptic modulator comprising:
an acoustooptic medium having a first face for receiving incident light to be diffracted, a second face for providing a diffracted light output, and a third face intersecting with said first and second faces, said medium having a central portion;
transducer means coupled to said third face for generating acoustic waves in said medium when excited, said transducer including a piezoelectric crystal plate and a plurality of electrode pairs sandwiching respective portions of said plate and aligned in a light passing direction extending between said first and second faces, the electrodes in one of said electrode pairs sandwiching the central portion of said acoustooptic medium having opposed areas larger than the opposed areas of any other electrode pair; and
excitation means for simultaneously exciting adjacent electrode pairs with opposite phases, whereby the acoustic waves generated in adjacent portions of said acoustooptic medium will be of opposite phases, the amplitude of acoustic waves generated in the central portion of said medium being larger than the amplitude of acoustic waves generated in any other portion of said medium.

6. An acoustooptic modulator comprising:
an acoustooptic member having a first face for receiving an incident light beam, a second face intersecting said first face, and a light passing portion, extending away from said first face in a light passing direction, for diffracting said incident light in response to acoustic waves, said acoustooptic member having a central portion;
an electroacoustic transducer coupled to said second face for generating acoustic waves in response to an applied electric field, said electroacoustic transducer having a main surface; and
excitation means, including a plurality of lower electrodes coupled to said main surface of said electroacoustic transducer along said light passing direction and disposed between said acoustooptic member and said electroacoustic transducer, for applying an electric field to said electroacoustic transducer, said applied electric field varying in intensity along said light passing direction with the intensity of the electric field applied to one of said lower electrodes near the central portion of said acoustooptic member being larger than the intensity of the electric field applied to other of said lower electrodes.

7. An acoustooptic modulator as defined in claim 6, wherein said electroacoustic transducer comprises a piezoelectric crystal plate, and wherein said excitation means includes a plurality of upper electrodes which, in conjunction with said lower electrodes, define a plurality of electrode pairs sandwiching respective portions of said plate, the distance between electrodes in each said electrode pair being smallest at substantially the middle of each electrode pair, said distance between electrodes in each electrode pair increasing with distance from the middle of each electrode in said light passing direction.

8. An acoustooptic modulator as defined in claims 6 or 7, wherein the acoustic waves coupled to said acoustooptic medium generate strains in said acoustoopic medium with the amplitudes of the strains in said medium having a distribution in said light passing direction which is substantially equal to a sinc function.

9. An acoustoopic modulator as defined in claim 8, wherein said sin function is defined by (sin X)/X, where X represents distance in said acoustoopic member along said light passing direction.

* * * * *

UNITED STATES PATENT AND TRADEMARK OFFICE
CERTIFICATE OF CORRECTION

PATENT NO. : 4,299,449

DATED : November 10, 1981

INVENTOR(S) : Yoshinori Ohta et al

Page 1 of 2

It is certified that error appears in the above—identified patent and that said Letters Patent is hereby corrected as shown below:

Column 1, line 35 - change "accoustooptic" to --acoustooptic--

Column 3, line 14 - change "wave" to --waves-- line 14 - after "therein" insert -- , -- line 53 - change "length 1" to --length $\ell$-- line 54 - change "length 1" to --length $\ell$-- line 61 - change "$(m/\theta'$ " to --$(\pi\ell\theta'$ -- line 61 - change "$(\pi/\theta'$ " to --$(\pi\ell\theta'$ --

Column 4, line 4 - change "1" to --$\ell$-- line 9 - change "length 1" to --length $\ell$--

UNITED STATES PATENT AND TRADEMARK OFFICE
CERTIFICATE OF CORRECTION

PATENT NO. : 4,299,449

DATED : November 10, 1981

INVENTOR(S) : Yoshinori Ohta et al

It is certified that error appears in the above—identified patent and that said Letters Patent is hereby corrected as shown below:

Column 4, line 37, "length 1" should read -- length $\ell$ --
         line 39, "length 1" should read -- length $\ell$ --
         line 51, "1" should read -- $\ell$ --
         line 52, "1/2" should read -- $\ell/2$ --

Signed and Sealed this

Twenty-second Day of June 1982

[SEAL]

Attest:

Attesting Officer

GERALD J. MOSSINGHOFF

*Commissioner of Patents and Trademarks*